A. C. GOUGH.
SEPARATOR.
APPLICATION FILED JUNE 21, 1918.
1,311,811.
Patented July 29, 1919.
3 SHEETS—SHEET 1.
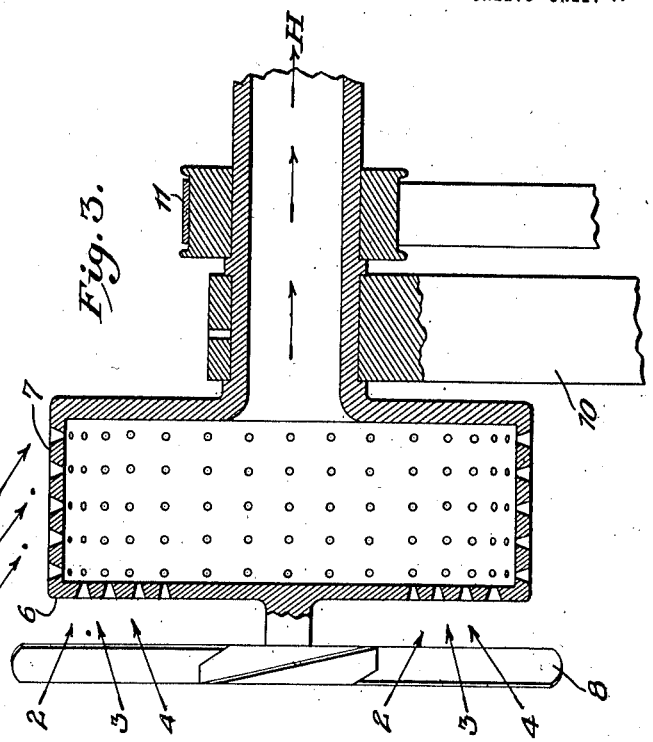
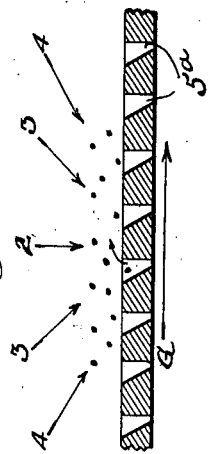
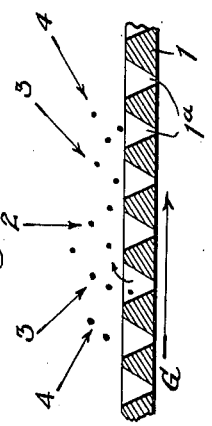
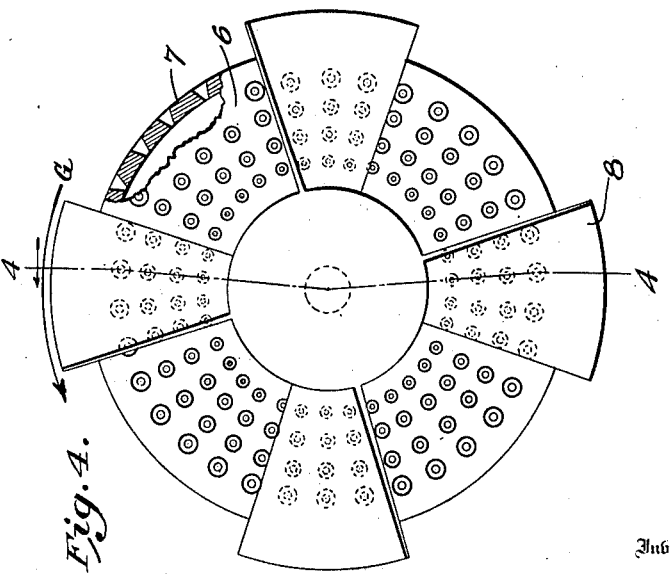
Inventor
Achilles C. Gough
By Mason Fenwick Lawrence,
Attorneys A. C. GOUGH.
SEPARATOR.
APPLICATION FILED JUNE 21, 1918.
1,311,811.
Patented July 29, 1919.
3 SHEETS—SHEET 2.
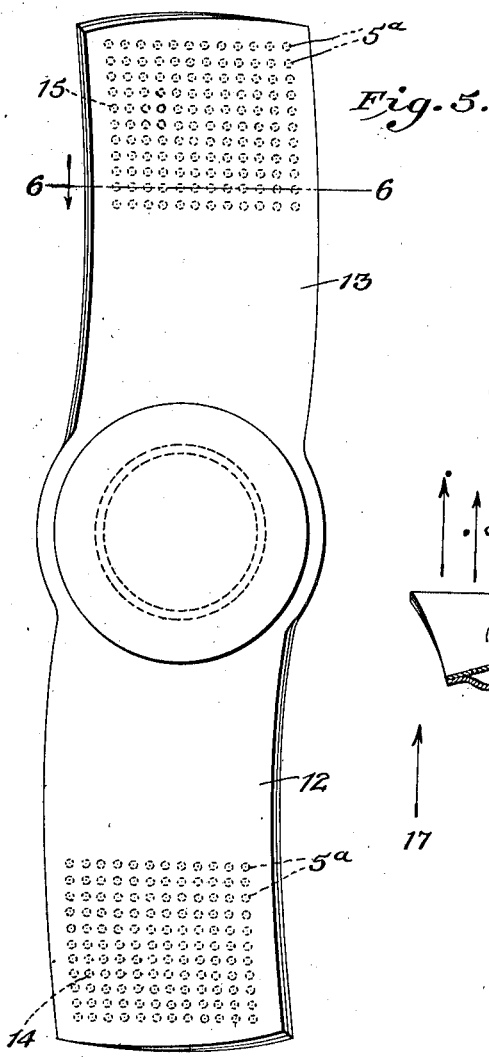
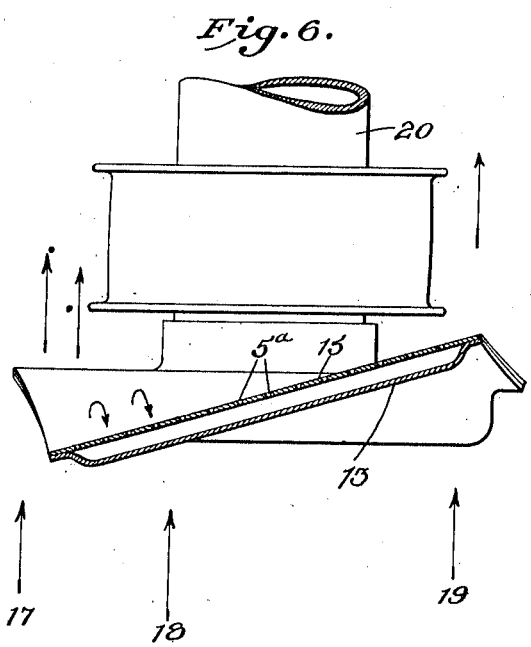
Inventor
Achilles C. Gough
By Mason Fenwick & Lawrence,
Attorneys

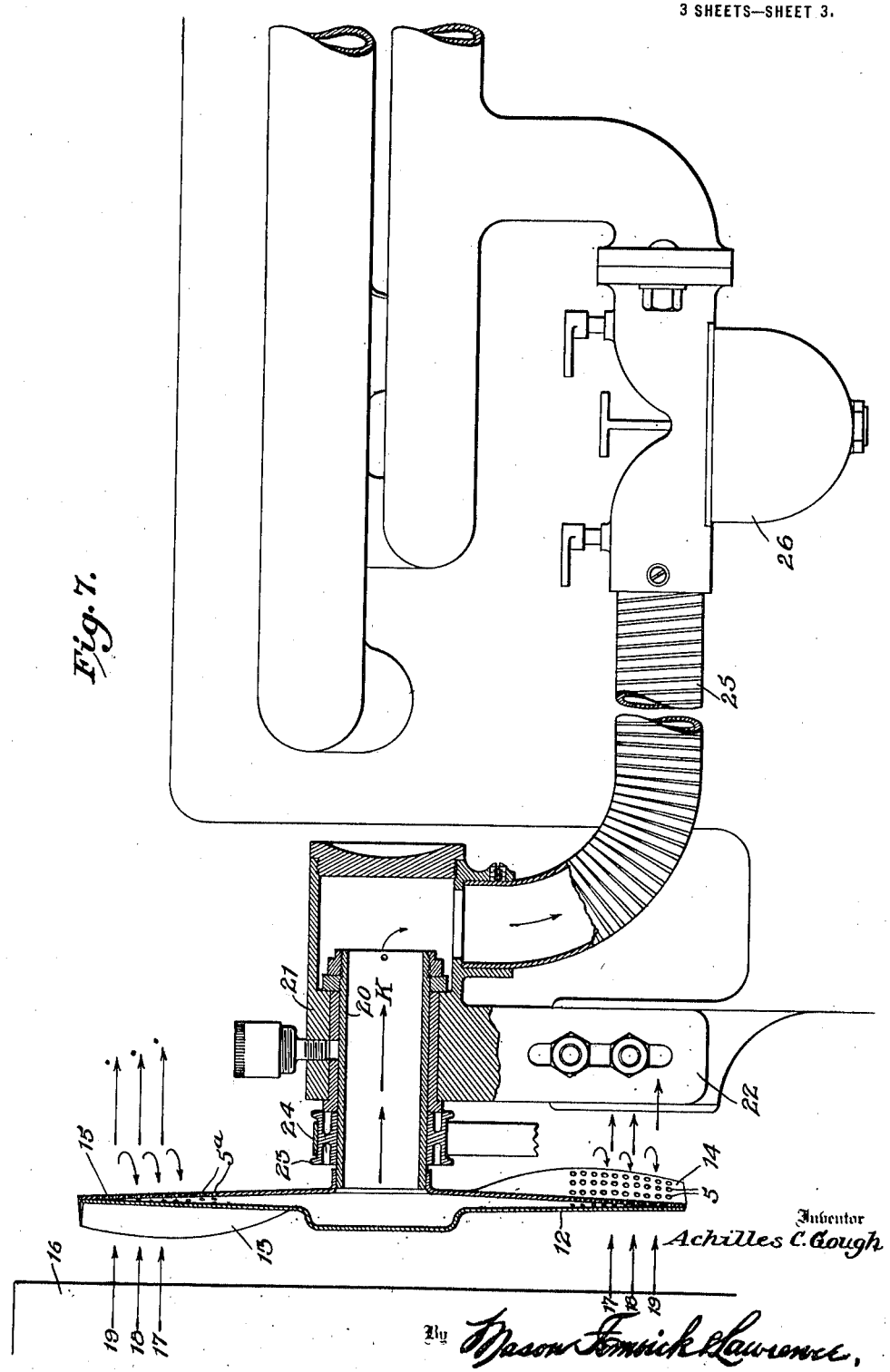

UNITED STATES PATENT OFFICE.

ACHILLES C. GOUGH, OF POCATELLO, IDAHO.

SEPARATOR.

1,311,811.     Specification of Letters Patent.     Patented July 29, 1919.

Application filed June 21, 1918. Serial No. 241,178.

*To all whom it may concern:*

Be it known that I, ACHILLES C. GOUGH, a citizen of the United States, residing at Pocatello, in the county of Bannock and State of Idaho, have invented certain new and useful Improvements in Separators; and I do hereby declare the following to be a full, clear, and exact description of the invention, such as will enable others skilled in the art to which it appertains to make and use the same.

This invention relates to rotary or moving screen separators, and has for an object the arrangement of improved means for separating or grading small particles which may be blown, thrown or suspended in the atmosphere or a gas, and that have a difference in size, velocity or amplitude of vibration.

A further object of the invention is the arrangement of improved means in a rotary screen or separator for utilizing both a disk and cylindrical screen in combination or singly.

Another object of the invention is the arrangement in a rotary screen separator, of improved means for moving the air, gases, or particles to be graded or separated toward or across the screen.

Another object of the invention is the arrangement in a moving screen separator, of improved means for supporting and imparting movement (rotary or otherwise) to the screen and to the accompanying fans or propellers.

A still further object of the invention is the arrangement in a rotary screen separator, of improved means for conducting the cleaned air, gases or the more finely divided of the graded particles to the desired point, the same being moved through the passage by vacuum produced by a pump, fans, internal combustion engine, air compressor, or any desirable means.

With these and other objects in view the invention comprises certain novel principles, constructions, combinations and arrangements of parts and the method as will be hereinafter more fully described and claimed.

In the accompanying drawings:

Figure 1 is a sectional view for the purpose of illustrating the fundamental principles involved in the invention.

Fig. 2 is a sectional view for the purpose of further illustrating the fundamental principles involved in the invention.

Fig. 3 is a front view of an embodiment of the invention, it being especially for the purposes of further illustrating the principles and to indicate some of the many forms in which this invention may be embodied.

Fig. 4 is a section through Fig. 3, approximately on the line 4—4.

Fig. 5 is a front view of an embodiment of the invention showing the screen incorporated with the cooling fan on an internal combustion engine for the purpose of separating the dust and thoroughly cleaning the air taken into the engine through the carbureter and for providing a better quality of air to the carbureter.

Fig. 6 is a section through Fig. 5, approximately on the line 6—6.

Fig. 7 is a vertical section and discloses certain fundamental arts necessary for operation as a dust separator or air cleaner for internal combustion engines.

In forming a device embodying the invention as a separator or air cleaner, the outlet of the same may be connected up to a fan, pump, air compressor, or internal combustion engine as disclosed. In the embodiment shown in Fig. 7 of the accompanying drawings, there is disclosed a cooling fan (incorporating the screen) carried by a hollow shaft which is supported by an adjustable pedestal bearing providing means for connecting the outlet of the hollow shaft to the carbureter by means of a flexible pipe and through which passage the cleaned air is drawn.

In order that the principles of the invention may be more clearly understood certain fragmentary views are shown as in Fig. 1, in which 1 indicates a moving screen provided with openings 1$^a$ having sloping sides. By making the openings of suitable size and regulating the speed of the screen 1 in the direction of the arrows G, gases or particles moving toward or across the screen as indicated by the arrows 2, 3 and 4 may or may not pass through the screen. Thus, by regulating the speed of the movement of the screen and the size of the openings, the particles may be graded, or when desired only particles of infinitesimal size may pass through. Thus, such particles as fine dust will be thrown off while the gases or the atmosphere may pass through the screen. In Fig. 2, 5 illustrates the principle mentioned and shows that the openings 5$^a$ need only slant opposite to the direction of the movement of the screen.

In Figs. 3 and 4, a rotary screen combines the disk and cylinder screens 6 and 7. 8 is a fan or other means for driving the atmosphere, gases, or particles toward or across the rotary screens. 9 indicates a hollow shaft carrying the screen 6—7, and it furnishes a passage for the cleaned atmosphere, gases or the more finely divided of the particles graded, and this may be caused to move in the direction of the arrows H by vacuum produced by any desirable means. 10 represents a bearing or support for the rotary screen, 11 shows a belt and pulley, though other means for imparting rotation to the screen may be employed.

In order that some of the various applications of the invention may be more clearly understood an embodiment is shown in the accompanying drawings designed to separate the dust or clean the air used by the internal combustion engine. The cooling fan may be formed of any number of hollow vanes, in this construction a fan comprising two vanes 12 and 13 is shown. The fan has hollow vanes for the purpose of allowing the air screened through fine openings 14 and 15 to pass on its way in the direction of the arrows K. The cooling atmosphere is drawn through the radiator 16 and impinges upon the hot engine cylinders as indicated by the direction of the arrows 17, 18, 19, the dust and other particles are also carried with the atmosphere in this direction since if it were drawn to the screen by the suction of the engine even the finest particles would be thrown off due to centrifugal force and the construction of the openings. 20 indicates a hollow shaft which carries the cooling fan, the same being supported by a suitable bearing 21 and adjustable pedestal or bracket, 22. The desired movement may be imparted to the fan by means of the pulley 23, and belt 24, the latter being run by a suitable pulley receiving motion from certain moving parts of the engine. The flexible pipe 25 furnishes a dust proof passage to the carbureter 26 and allows the pedestal or bracket 22 to be raised or lowered for the purpose of adjusting the tension of the fan belt 24.

What I claim is:

1. A separator comprising a rotary screen of hollow structure its wall or walls being substantially smooth on the inside and on the outside and provided with apertures of outwardly divergent form, means for causing a flow of air into the screen through the apertures, whereby when the screen is rotated the heavier particles are centrifugally rejected by the divergent openings.

2. In combination, a rotary screen consisting of a hollow structure having its wall or walls provided with intake openings which outwardly diverge, a hollow shaft communicating with the screen and a support on which it is journaled, and means for establishing an induced air flow through the screen and shaft, heavy particles in the air being centrifugally rejected so that cleaned air flows through the system by the divergent openings.

3. The combination with an internal combustion engine, of a hollow fan having blades provided with openings in their walls, means for rotating the fan, and a connection, including a carbureter, between the chamber of the device and the engine whereby operation of the latter draws air through the screen and connection the organization sending screened air to the carbureter and the engine, the fan also blowing air against the engine.

4. In combination, a rotary screen consisting of a hollow fan having blades with intake openings in their wall and which outwardly diverge, a hollow shaft communicating with the screen and a support on which it is journaled, and means for establishing an induced air flow through the screen and shaft, heavy particles in the air being centrifugally rejected by the divergent openings so that cleaned air flows through the system.

5. The combination with an internal combustion engine, of a hollow fan having blades provided with openings in its walls, means for rotating the fan, and a connection, including a carbureter, between the chamber of the fan and the engine whereby operation of the latter draws air through the screen and connection, the organization conducting screened air to the carbureter and the engine.

In testimony whereof I affix my signature.

ACHILLES C. GOUGH.